US005809397A

United States Patent [19]

Harthcock et al.

[11] Patent Number: 5,809,397
[45] Date of Patent: Sep. 15, 1998

[54] METHOD AND APPARATUS FOR SYSTEM SYNCHRONIZATION IN A MESSAGING SYSTEM

[75] Inventors: Andrew Holloman Harthcock, Keller; Soeren Henrik Thomsen, North Richland Hills; Anselm Irenius Sequeira, Keller; Thomas Glenn Perry, Fort Worth, all of Tex.

[73] Assignee: Motorola, Inc., Schaumburg, Ill.

[21] Appl. No.: 608,914

[22] Filed: Feb. 29, 1996

[51] Int. Cl.[6] .............................. H04B 7/19; H04B 1/06
[52] U.S. Cl. .......................................... 455/13.2; 455/260
[58] Field of Search .................................. 455/12.1, 13.1, 455/13.2, 256, 257, 260, 264, 265; 327/147–150; 331/2

[56] References Cited

U.S. PATENT DOCUMENTS

| | | | |
|---|---|---|---|
| 3,742,498 | 6/1973 | Dunn | 455/13.1 |
| 4,004,098 | 1/1977 | Shimasaki | 455/13.1 |
| 4,287,597 | 9/1981 | Paynter et al. | 455/12.1 |
| 4,607,257 | 8/1986 | Noguchi | 455/13.2 |
| 5,038,115 | 8/1991 | Myers et al. | 455/260 |
| 5,261,118 | 11/1993 | Vanderspool, II et al. | 455/12.1 |
| 5,329,251 | 7/1994 | Llewellyn | 331/2 |
| 5,355,529 | 10/1994 | Linquist et al. | |
| 5,561,838 | 10/1996 | Chandos et al. | 455/13.2 |
| 5,602,920 | 2/1997 | Bestler et al. | 370/412 |
| 5,610,558 | 3/1997 | Mittel et al. | 455/260 |
| 5,613,195 | 3/1997 | Ooi | 455/13.2 |

*Primary Examiner*—Edward F. Urban
*Assistant Examiner*—Sam Bhattacharya
*Attorney, Agent, or Firm*—Charles W. Bethards

[57] ABSTRACT

A selective call messaging system comprises a control point satellite uplink (24) for transmission of source information to a satellite (12), the source information having timing information, a base station (16) for receiving the source information from the satellite and for retransmitting the source information to a receiver 18. A synchronization controller 29 is coupled to the receiver 18 and remotely coupled to the control point satellite uplink. The synchronization controller comprises a decoder (40) for decoding the timing information received from the base station to provide actual timing information, an absolute time source (28) that generates a reference time, a comparator (42) for comparing the actual timing information with the reference time to provide an offset signal (44) and a transmitter for forwarding the offset signal to the control point satellite uplink to adjust timing information at the control point satellite uplink.

22 Claims, 5 Drawing Sheets

METHOD AND APPARATUS FOR SYSTEM SYNCHRONIZATION IN A MESSAGING SYSTEM

TECHNICAL FIELD

This invention relates generally to synchronization of a paging system, and in particular, to a messaging system using an absolute time base in a closed loop configuration.

BACKGROUND

Today's direct synchronization systems that use satellite transmissions to synchronize paging transmitters fail to account for "satellite wobble". The problem occurs in not accounting for the variation in the distance between the earth and a satellite throughout a single day. A geo-synchronous satellite is subject to the gravitational forces of the moon and sun and therefore moves around in a periodical pattern when observed from the ground. This results in a propagation delay variation of about 100 to 400 microseconds over the course of a 24 hour period. Additionally, use of booster rockets by a satellite to realign the satellite will likewise create the same type of problem, but moreso since the "wobble" is artificially created in a very short time span. In any event, since the propagation delays to all the remote sites change by virtually the same amount, the variation has hardly any adverse impact on the simulcast synchronization between base transmitters. But the time difference between the remote base transmitters and the control point varies proportionally to the satellite movement. In a one way simulcast system, the critical factor is that the base transmitters launch the same message at substantially the same time.

In 2-way paging schemes using protocols such as Motorola's ReFLEX™ and InFLEXion™ protocols where timing is even more critical, timing of the return path is based on the outbound path (the path out from the base transmitters). Essentially, return transmissions (the path from a subscriber unit back to the system) are sent in synchronization with outbound FLEX™ frames in order for the system to function appropriately. Likewise, in a one-way messaging simulcast scenario, the transmitting base stations must stay in synchronization in order to maintain the integrity of the received messages at a subscriber unit. Thus, a need exists for a synchronization method and apparatus that will account for satellite wobble and maintain a synchronized messaging system.

SUMMARY OF THE INVENTION

A method for providing time synchronization in a messaging system comprises the steps of receiving source information from a satellite, the source information having timing information and originating from a control point satellite uplink and being received by a plurality of receivers. Then, an absolute time reference is received at a receiver coupled to one of the plurality of receivers. Then, an offset signal is generated and calculated from the difference between the absolute time reference and the timing information of the source information. Finally, the control point satellite uplink is provided with the offset signal in order to adjust the timing information within subsequent source information transmissions from the control point satellite uplink.

In another aspect of the present invention, a synchronization controller for use in a selective call messaging system comprises a decoder for decoding timing information received from a selective call transmitter base station to provide actual timing information, an absolute time source that generates a reference time, a comparator for comparing the actual timing information with the reference time to provide an offset signal, and a transmitter for forwarding the offset signal to a control point satellite uplink to adjust timing information at the control point satellite uplink.

DETAILED DESCRIPTION OF THE PREFERRED EMBODIMENT

Figure 1:
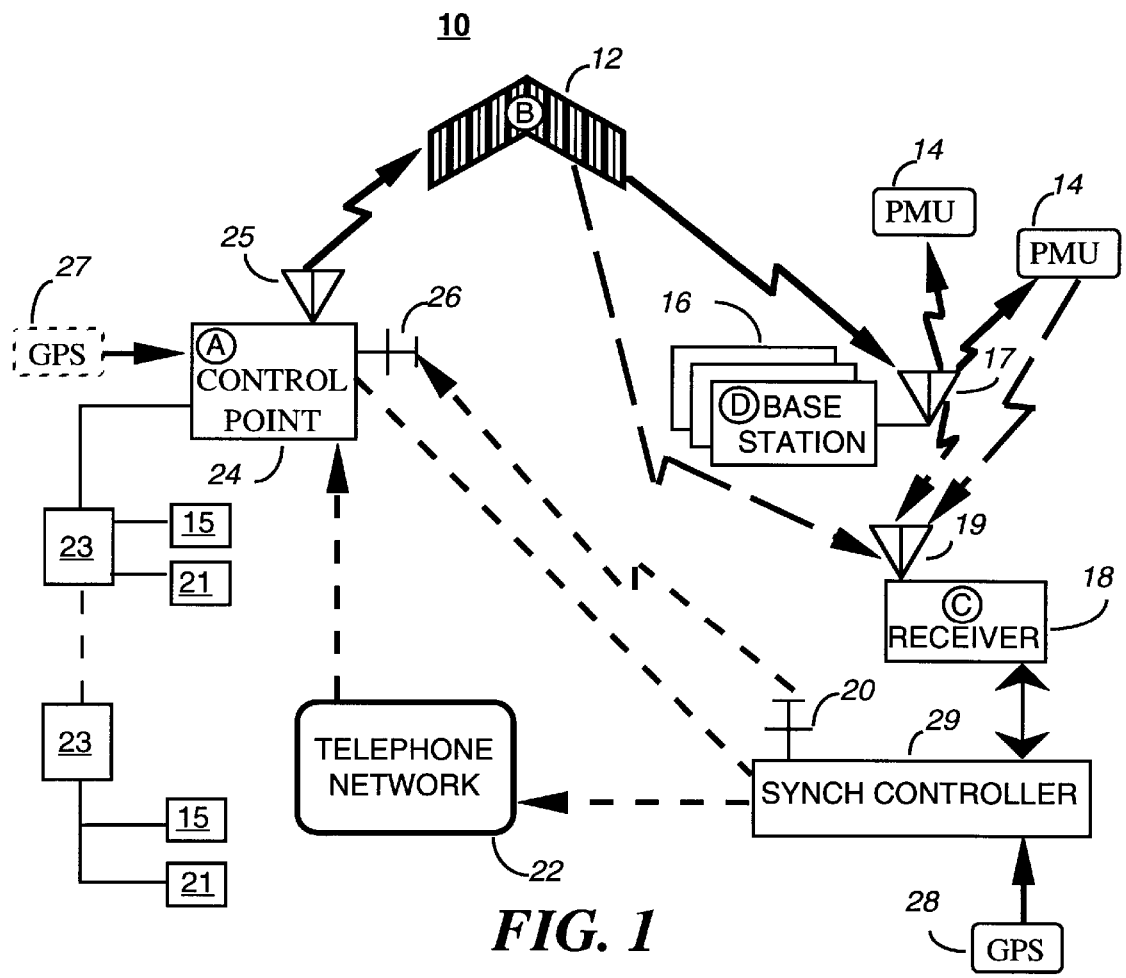
FIG. 1 is a block diagram of a messaging system using the synchronization method and apparatus in accordance with the present invention.

In the present invention, a time reference such as a Global Positioning System (GPS) time stamp from a GPS receiver is preferably used at the Control Point and at one of the Receiver sites. In current one way paging configurations, a technique known as "Direct Sync" is used for the transmitter sites to derive system timing reference from the Control Point. This removes the requirement for GPS references at the transmitter sites and provides a significant cost reduction to the system designer. The stability provided, although sufficient for one way paging, has questionable stability to meet the needs of the 2-way environment unless other measures are taken.

Specifically, Direct Sync systems have two types of drift over time: system wide and site. System wide drift occurs from variance of the link components that affect all transmitter sites alike. An example is the slight drift occurring due to satellite movement relative to the Earth. Since all sites move in unison, the one way system is not adversely affected by this phenomenon. Site drift, on the other hand, does affect one way performance. An example would be hardware variances in the Phase Lock Loop circuitry causing an individual site to drift away from the desired system synchronization.

Unfortunately, 2-way paging systems using Direct Sync are affected by both types of errors. Since the receivers use an absolute reference such as GPS to indicate when to expect return path transmissions, site drift, as well as system wide drift of the outbound infrastructure, introduces synchronization error. This invention comprises a method and device that preferably measures continuously the time differential between an absolute time reference and an embedded time reference within a signal. A good example of this is the time difference found between GPS and actual FLEX synchronization pulses received by the outbound infrastructure such as a base station transmitter. This differential is read by a synchronization controller, possibly residing in a system controller (such as Motorola's RF-Conductor™) and used to adjust either the outbound transmissions or the expected arrival time of return path transmissions at the receivers. Thus, a closed loop is created and dynamically changing systems may be kept permanently synchronized. Furthermore, a cost savings is created by using no additional GPS receivers to achieve the time calculation. In other words, in one embodiment of the present invention, only one absolute time reference is required in each "market", wherein a market could comprise a plurality of base station transmitters in a geographical area or region. It should be noted that it is contemplated within the claims of the present invention that other absolute time references could be used instead of GPS and that use of an absolute time reference at the control point is not necessarily required in the present invention.

Another example where measuring the time differential between an absolute time reference and an embedded time reference could prove beneficial in synchronizing a messaging system can be found with Motorola's C-NET™ paging system. The C-NET protocol has time marks that are embedded in the C-NET data stream. The C-NET stream consists of equal sized frames. The point in time that goes with each time mark is marked by a frame boundary and the time of day that goes with each time mark is encoded in the data stream in the frame(s) following the time mark frame boundary. Thus, as described above with respect to FLEX, a system could be devised using GPS and the embedded timing information in C-NET to determine an offset signal to synchronize a messaging system. The difference between using FLEX for synchronization and C-NET for synchronization is that there is no need to use the outbound infrastructure (base transmitters) for synchronization using C-NET. C-NET information can be directly received by a satellite receiver that can either be co-located or remotely located from a base station transmitter. In another embodiment, the satellite receiver could be co-located with a control point satellite uplink that initially provides the source information to the satellite. It should also be understood that an "offset signal" in the context of the present invention can mean inter alia the adjustment of a time clock reference itself, the adjustment of a time mark relative to a time clock reference, or the adjustment of an embedded time reference in data within a signal.

Referring to FIG. 1, a messaging system 10 preferably comprises a control point satellite uplink 24 having an antenna 25 for relaying source information that may have been obtained from a plurality of messaging terminals 23 that received data input from a variety of input devices such as telephones 15 or computers 21. The source information has timing information that can be innate to a given protocol such as C-NET or FLEX™ using time division or alternatively it can further rely on an absolute time reference, such as an atomic clock or cesium clock, but preferably a GPS time stamp from a GPS receiver 27 is used to generate the timing information. The source information is then preferably relayed through a satellite 12 and received using a satellite receiver located at a plurality of base stations 16 that are preferably spread within the footprint of the satellite signal. The base stations preferably have transmitters that transmit (preferably using the FLEX™ protocol, wherein the information transmitted from the base stations 16 is encoded in FLEX™) from an antenna 17 to a plurality of receivers (14 & 18). The receivers 14 can be portable Personal Messaging Units (PMU's) that receive and transmit selective call messages such as Motorola's Tango™ two-way receivers or a receiver 18 having an antenna 19 such as Motorola's RF-Audience™ base receivers that likewise receive the source information. The receiver 18 may be co-located with a particular base station 16, but this is not necessarily required. As will be discussed later in an alternative embodiment, the receiver 18 could also be a link monitor co-located with the control point 24. Preferably, for each geographic market, only one GPS receiver 28 is required and coupled to the receiver 18 for use in the present invention, although the present invention contemplates using a GPS receiver coupled to any number of PMU's or RF-Audiences if costs permit. Thus, an absolute time reference is received by the GPS receiver 28 which is coupled to the receiver 18 and a synchronization controller 29. Operationally, the synchronization controller 29, receiver 18 and GPS receiver 28 work in conjunction to provide an offset signal back to the control point uplink transmitter 24. This closed loop system can either be accomplished using landlines and a telephone network 22 or alternatively a microwave communication or other over the air link using antennas 20 and 26 at the synchronization controller and control point uplink transmitter respectively. If the synchronization controller 29 is co-located with the control point 24, then they can be directly coupled or hardwired as indicated by the dashed line coupling the control point and the synchronization controller directly.

Figure 2:
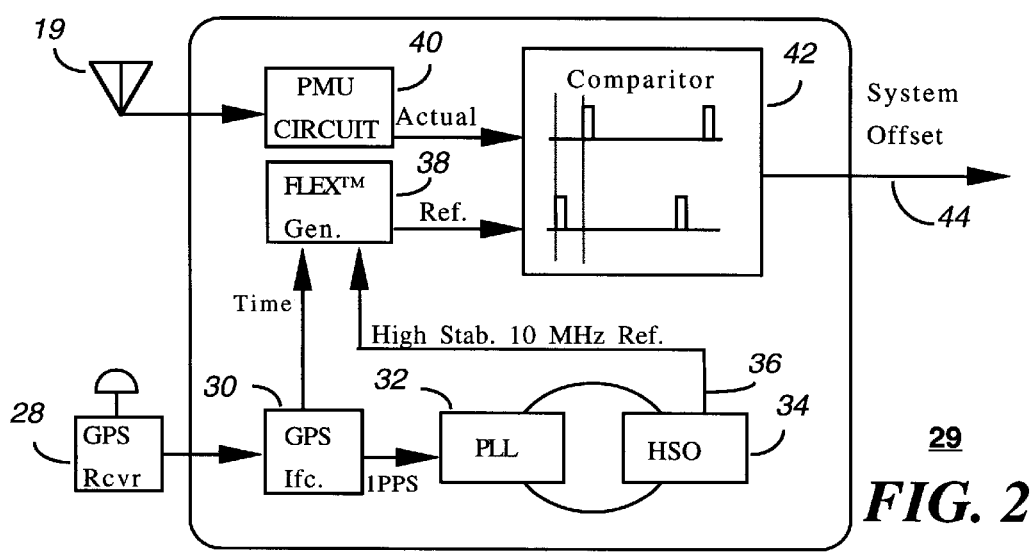
FIG. 2 is a block diagram of a synchronization controller in accordance with the present invention.
Figure 3:
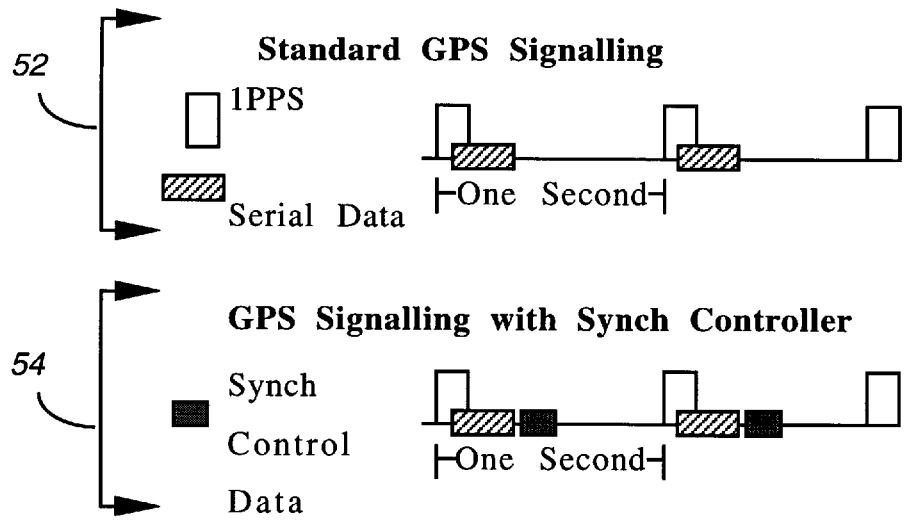
FIG. 3 is a timing diagram of standard GPS signaling along with a timing diagram of GPS signaling with synchronization control data in accordance with the present invention.
Figure 4:
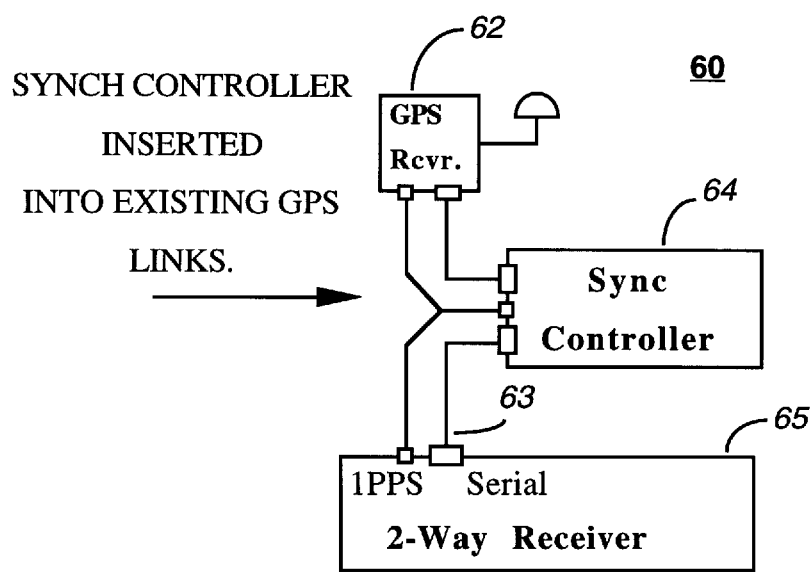
FIG. 4 is a block diagram of a GPS receiver coupled to the synchronization controller and a receiver in accordance with the present invention.

Referring FIGS. 1 & 2, the synchronization controller 29 is designed for precise synchronization of outbound and inbound channels used in ReFLEX™ and InFLEXion™ systems. This device preferably uses the following basic components shown in FIG. 2: PMU Circuit 40, GPS Interface 30, High Stability Oscillator (HSO) 34, Phase Lock Loop (PLL) 32 system, FLEX™ Generator 38, and a Comparator system 42. The PMU receiver circuit 40 is used to generate (actual) FLEX™ synchronization pulses read from the outbound channel transmitters. Essentially, this circuit provides system timing as seen by the PMUs. This component also uses PLL technology to stabilize the timing pulses. The PMU receiver circuit 40 employs a decoder for decoding timing information received from a selective call transmitter base station to provide actual timing information. If desired, the receiver 18 and the PMU circuit 40 could be the same device, thus eliminating the need for two receivers. The GPS interface 30 provides dual functionality. As indicated in FIG. 2, it decodes the GPS time-stamp and validates the 1 Pulse Per Second (1 PPS) input. It then provides a valid 1 PPS signal to the PLL and the time of day to the FLEX™ Generator. GPS receiver 28 thus provides an absolute time source that generates a reference time. The second function of the GPS Interface is to send and receive control information to/from any other device previously connected directly to the GPS receiver. This allows the synchronization controller 29 to be incorporated into existing designs without the need for an additional GPS Receiver or hardware modifications to Return Channel Receivers. Refer to FIG. 3 for a description of multiplexed GPS/synchronization controller 29 signaling and FIG. 4 for physical System Interconnect in system 60. Essentially all data sent by the GPS receiver 62 to the synchronization controller 64 is retransmitted by the synchronization controller 64.

Synchronization controller 64 transmissions are then sent after the GPS receiver time/date stamp data. Information sent via serial line 63 to the synchronization controller 64 is preceded by a character which inhibits retransmission to the GPS Receiver. This allows explicit direction of control data to either of the synchronization controller 64 or GPS receiver 62.

Referring again to FIG. 2, the Phase Lock Loop (PLL) 32 acts with the High Stability Oscillator (HSO) 34 to produce an extremely accurate reference signal such as a 10 MHz clock reference signal 36. This signal 36 is used by the FLEX™ Sync Generator 38. The FLEX™ Sync Generator 38 takes input from the GPS interface 30 and clock reference signal 36 to produce an ideal FLEX™ reference for use by the comparator 42. The comparator 42 then measures the difference between the ideal reference from the FLEX™ Sync Generator 38 and the actual FLEX™ sync pulse from the PMU circuit 40, subtracts any pre-programmed offsets, then outputs a System Offset 44 in microseconds preferably via line 63 (of FIG. 4). This data is provided to the GPS Interface module for transmission out of the synchronization controller 29.

Referring to FIG. 1 again with respect to an alternative embodiment, the receiver 18 could be a link monitor that is co-located with the control point satellite uplink 24. A single GPS reference 28 could be coupled to both the receiver 18 and the uplink 24. Both the uplink 24 and the receiver 24 synchronize their watches to GPS time. The uplink could be configured to provide C-NET protocol information outbound to the satellite 12 and the receiver 18 could be configured to receive the same C-NET stream from a downlink, thus the receiver operates as a link monitor. Thus, actual propagation delays can be measured from the uplink 24 to the link monitor (18) and other link propagation delays can be determined by using the coordinates of the locations of the satellite (12), link monitor (18) and each of the base stations (16).

To determine a snapshot of the individual link delays, the receiver 18 is used to measure the absolute link delay of the satellite link to the receiver 18 itself. This delay is $T_{AC}$, the propagation delay from point A to point C in FIG. 1. Since the uplink 24 in this example is GPS synchronized, $T_{AC}$ is simply the time difference seen by the receiver 18 between the GPS time marks and the direct sync time marks from the C-NET protocol received at the receiver 18. The downlink delay $T_{BC}$ is then calculated using the co-ordinates of the satellite and the co-ordinates of the receiver 18. This delay is then subtracted from the total link delay $T_{AC}$ to arrive at the uplink delay $T_{AB}$. $T_{AB}$ is the propagation delay from the uplink 24 to the output side of the satellite's transponder and is common to all the propagation delays experienced by the base transmitters.

For each base transmitter, the downlink delay $T_{BD}$ is then calculated using the co-ordinates of the satellite and the co-ordinates of each base station transmitter. Adding $T_{AB}$ and $T_{BD}$ yields the individual absolute propagation delays $T_{AD}$. The $T_{AD}$ values are then communicated from the uplink 24 to the base station transmitters 16 via C-NET Infrastructure Command Messages (ICMs). Each base transmitter sets its time offset to the absolute propagation delay value received, and system-wide GPS synchronization can be obtained.

Note, if the satellite's position is not known with sufficient precision, e.g., due to the wobble, the computed propagation delays $T_{AD}$, will be in error by some amount. For most paging system geometries the error in $T_{AC}$ will be relatively small though, since inaccurate satellite co-ordinates will impact $T_{BC}$ and $T_{BD}$ by about the same amount, and $T_{AD}$ is calculated as $T_{AC}-T_{BC}+T_{BD}$.

If the error in $T_{AD}$ is significant enough to cause a problem, either because neighboring base transmitters are not perfectly synchronized to each other or because the base transmitters are not perfectly synchronized to GPS time, the satellite's position can be determined using triangularization. This requires 4 link monitors located far apart, each equipped with a GPS reference and a C-NET downlink. The 4 $T_{AC}$ values measured by the 4 link monitors corresponds to 4 equations with 4 unknowns, namely the satellite's x, y, and z co-ordinates and the uplink delay $T_{AB}$.

Once the initial snapshot of the absolute link delay is obtained, the link monitor (18) can continuously monitor the changes in the absolute link delay. Time wobble will be due to the satellite's position wobble over time. Each time the time wobble has changed by a significant amount (can be a predetermined such as a few microseconds), the uplink 24 can communicate the change to the remote base station transmitters 16 via one or more ICMs. The base station transmitters will change their individual offsets by the corresponding received time wobble amount, and system-wide GPS synchronization is maintained.

In a more sophisticated implementation where greater accuracy can be achieved, 4 link monitors would be used to obtain the satellite position wobble in the x, y, z co-ordinates (compare to above where just the resulting time wobble on a particular link was obtained.) The resulting time wobble experienced by each base transmitter would then be calculated at the uplink 24 and communicated to each individual base station transmitter 16 via an ICM (compare to the above where the same time wobble value was sent to all the base transmitters, i.e., it was assumed that all the base transmitters were impacted by about the same amount by the satellite position wobble.)

A compromise implementation exists where a single link monitor is used to obtain the satellite time wobble. If this time wobble can be translated back to the satellite's x, y, and z wobble reasonably well, then the resulting time wobble seen by each individual base station transmitter can be calculated and communicated to each base station transmitter, In yet another embodiment, the actual x, y and z wobble values can be communicated to the base transmitters instead of the resulting individual time wobbles. The base transmitters themselves would then convert from satellite x, y, z wobble to their own individual time wobble based on co-ordinates of the satellite and themselves. The advantage of this last embodiment is that the x, y, and z wobble data can be sent as a single all-call ICM.

Also, if it is decided that it is sufficient to send the same time wobble to all base station transmitters, there is an alternative to sending an ICM informing the base station transmitters of the change. The alternative is to adjust the Direct Sync Time Marks embedded in the C-NET stream by the amount of the time wobble. This has the advantage that there is no risk of losing the ICM on the link. Note that whether an ICM is used or the Direct Sync Time Marks are adjusted, the timing transition that is necessary to account for the time wobble is preferably performed gradually so that the system synchronization is not at risk during the transition.

The difference between the different embodiments account for the different methods for netting out the time error caused by wobble. It helps to note that what is sent over the satellite link to synchronize the sites generally are Time Marks, which each consists of both the marking of a point in time and a numeric value (the time) assigned to that point in time.

In one embodiment, the wobble error is eliminated at the control point satellite uplink by moving the Time Marks in time (i.e., the marker component of the Time Mark is moved), so that the Time Marks arrive at the correct time to the sites, i.e., they arrive to the sites at the same time as if there had been no wobble and also no correction is made to the embedded information of the Time Mark by the control point satellite uplink.

In other approaches, there is the case where the control point satellite uplink adjusts the numeric value (the time) component of each Time Mark in the amount necessary to net out the wobble. Compared to previous embodiment, the Time Marks no longer arrive at the same time to the sites, rather they move around by the amount of the wobble but the numeric information embedded in each Time Mark is also adjusted to move by the same amount directed by the control point satellite uplink. In another approach along these lines, there is the case of offsetting local time at the sites, i.e., the sites are told how big the error is and they adjust their local watch accordingly.

In addition to the above three methods, other methods could use the fact that the control point satellite uplink sends out not only Time Marks, but also a Launch Time for each page data message sent to the sites. (In a high speed paging system using simulcasting, base station transmitters will typically store the paging data received from a control point until it is time to launch (forward) the paging data on the paging RF channel.) So instead of trying to set the local time at the sites correctly, which all the previous embodiments have in common, the same net effect can be achieved by adjusting the Launch Times by the amount of the wobble. Since the Launch Times can be adjusted either at the control point satellite uplink or at the sites, this yields another two additional embodiments for netting out the wobble. Thus, the "offset signal" can take many forms in the context of this invention, e.g., Time Mark shifting, Time Mark embedded data alterations, Launch Time changes, satellite coordinate changes, actual or estimated propagation delay values.

Figure 5:
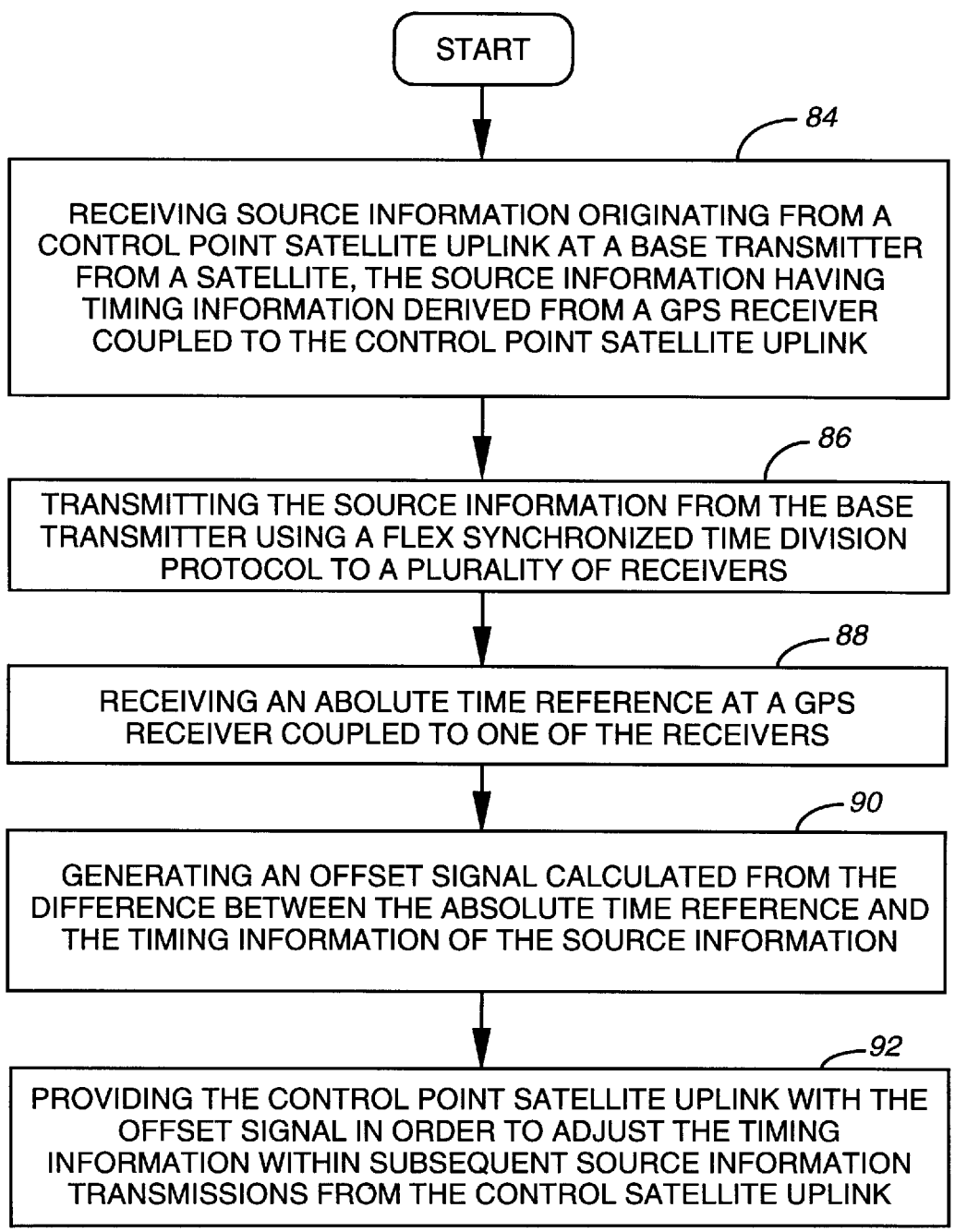
FIG. 5 is a flow chart of the synchronization process in accordance with the present invention.

Referring to FIG. 5, a flow chart 80 describes one method of the synchronization process in accordance with the present invention. The method starts at step 84 by receiving source information originating from a control point satellite uplink at a base transmitter from a satellite, the source information having timing information derived from a Global Positioning System receiver coupled to the control point satellite uplink. Next, at step 86 the source information is transmitted from the base transmitter using a FLEX synchronized time division protocol to a plurality of receivers. At step 88, an absolute time reference is received at a Global Positioning System receiver coupled to one of the plurality of receivers. Then, at step 90, an offset signal is generated and calculated from the difference between the absolute time reference and the timing information of the source information. Finally, at step 92, the control point satellite uplink is provided with the offset signal in order to adjust the timing information within subsequent source information transmissions from the control satellite uplink.

The present invention is based on the idea of comparing an absolute time reference such as a GPS reference with system information measured using a receiver from a standard system component (the PMU, base receiver, or link monitor.) In another embodiment, it is also based on the concept of multiplexing data on the GPS serial line.

Figure 6:
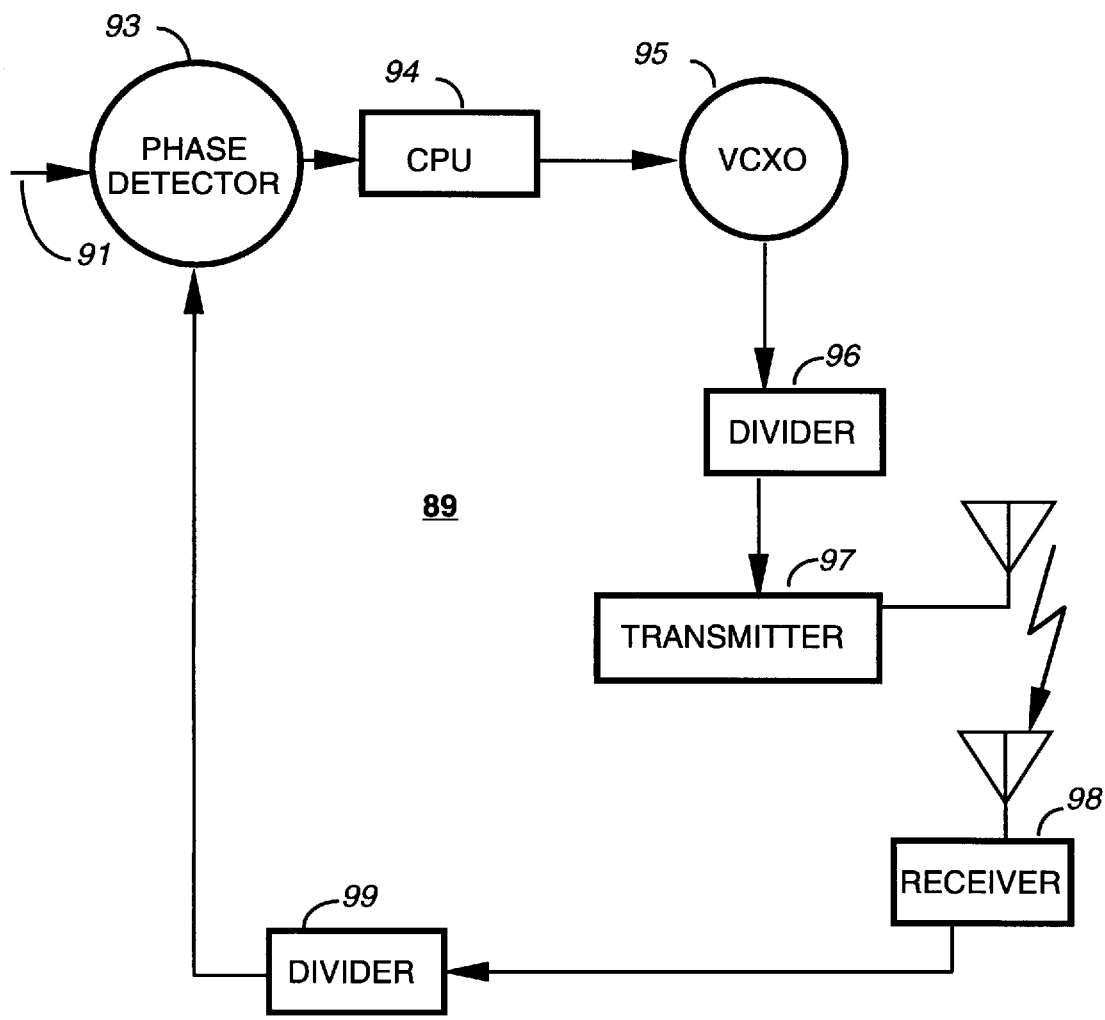
FIG. 6 is a block diagram of a synchronization loop in accordance with the present invention.

Referring to FIG. 6, in accordance with the present invention, a simple implementation can be represented by a loop 89 wherein an absolute time reference 91 such as a 1 pps GPS signal is used to create a local time clock that is transmitted to a satellite and received at a satellite downlink receiver for comparison and adjustment of the local time clock. More specifically, a phase detector 93, a CPU 94 and a stable oscillator 95 is used in an algorithm that adjusts the local clock such that the local clock locks to the absolute reference 91. The local clock is divided by divider 96 for suitable transmission via a satellite uplink or transmitter 97. The satellite (not shown) relays the clock information to a satellite receiver 98. Another divider 99 is used to transform the clock for suitable comparison in the phase detector 93 with the absolute time reference 91. In this manner, the local time clock at the downlink maintains synchronization with the absolute time reference.

Figure 7:
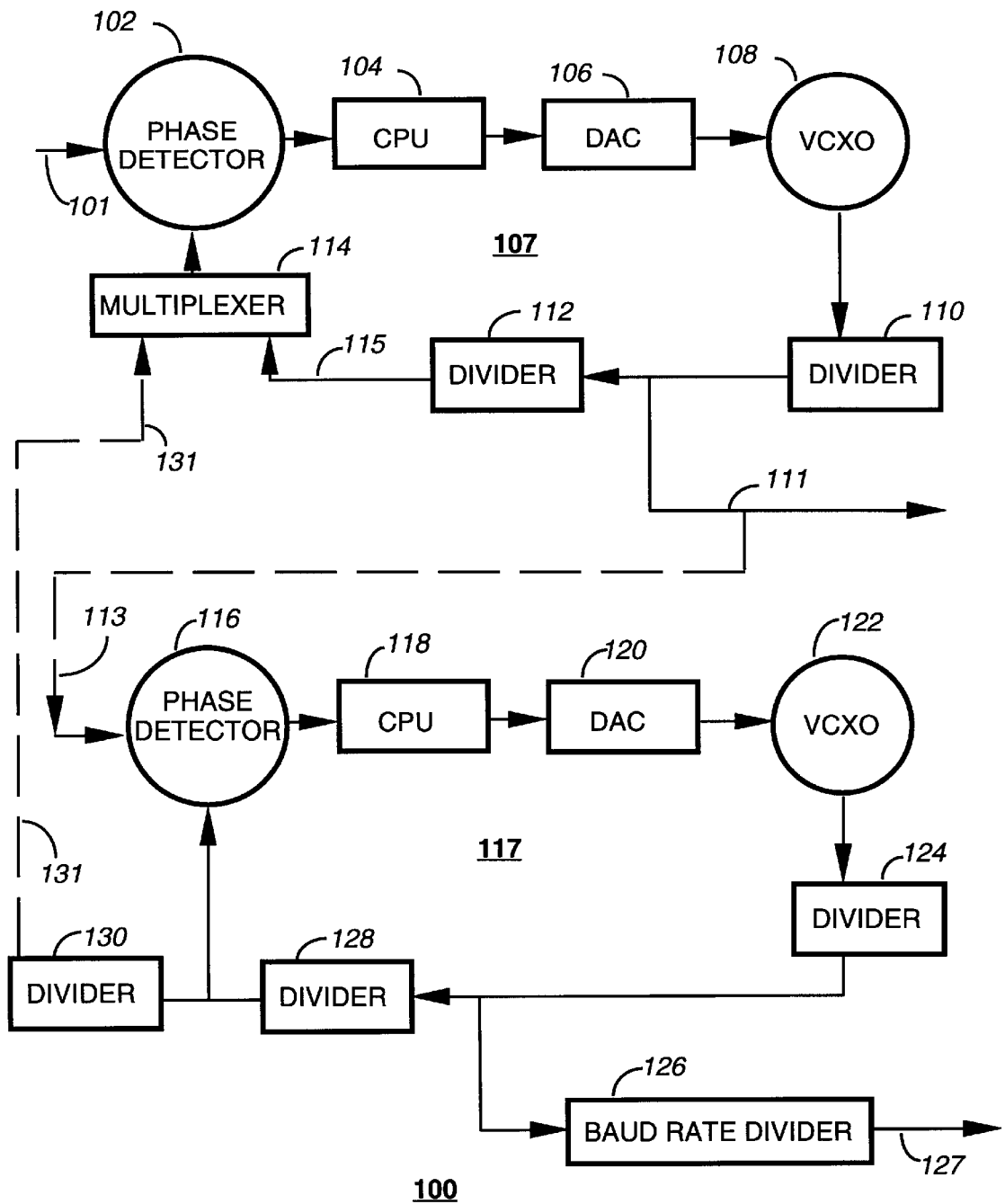
FIG. 7 is a block diagram of multiplexed phase lock loops in accordance with the present invention.

Referring to FIG. 7, a block diagram 100 in accordance with the present invention is shown having a first phase lock loop 107 from a control point coupled to a second phase lock loop 117 from a receiver. Preferably the first phase lock loop 107 is part of Motorola's RF-Conductor™ (RFC) and the second phase lock loop 117 is preferably part of Motorola's Network Interface Unit (NIU). The RFC typically forms part of the control point and the NIU is typically interfaced with the base receivers. The first phase lock loop 107 preferably comprises a phase detector 102 for detecting a GPS signal 101. The phase detector 102 is coupled to a central processing unit (CPU) 104 which in turn is coupled to a digital to analog converter (DAC) 106. The DAC 106 is preferably coupled to a high stability voltage controlled oscillator 108 which provides its signal to a first divider 110. The first divider 110 provides a divided down signal to a second divider 112. The first loop is completed by coupling the second divider 112 to the phase detector 102 via a multiplexer 114. The signal 115 provided by the second divider preferably provides a divided down 1 Hertz signal that is multiplexed with the 1 Hertz signal 131 coming from the second phase lock loop 117.

Likewise, the second phase lock loop 117 preferably comprises a phase detector 116 for detecting a C-NET (or equivalent protocol) frame pulse 113. The phase detector 116 is coupled to a central processing unit (CPU) 118 which in turn is coupled to a digital to analog converter (DAC) 120. The DAC 120 is preferably coupled to a high stability voltage controlled oscillator 122 which provides its signal to a first divider 124. The first divider 124 provides a divided down signal to a second divider 128. The second loop is completed by coupling the second divider 128 to the phase detector 116. Additionally, the output of the second divider 128 is applied to a third divider 130 which in turn divides down the signal to a 1 Hertz signal 131 that is applied to the multiplexer 114. Additionally, a base station transmitter clock signal 127 is derived from applying the output of the divider 124 to a baud rate divider 126.

Motorola's RFC's are typically placed at the control point and are responsible for providing timing information through a distribution link to all the NIUs which in turn control the timing of signals broadcast by the respective base station transmitters.

The first phase lock loop 107 preferably receives a C-NET stream from a digital satellite link. The timing embedded in the C-NET (or equivalent) protocol found in signal 118 is used by the second phase lock loop 117 to lock its internal clock to the time broadcast by the RFC (signal 111). When the RFC is referenced to a GPS signal 101, the time in the second phase lock loop 117 (the NIU) will track GPS time very closely. The main variation in the NIU timing will be due to the satellite wobble.

Operationally, upon power-up or reset at the control point, a GPS 1 pps is applied to one input of the phase detector 102 and the multiplexer 114 in the first phase lock loop 107 is set to allow the RFC to lock its internal high stability oscillator 108 to the GPS system. In other words, after a delay allowing all the NIU's to lock to the received C-NET stream, transmissions begin. The output of the high stability oscillator is divided down to 1 Hertz and applied to another input of the phase detector 102. Once this is accomplished, the RFC switches the multiplexer so that it now compares the 1 Hertz signal from the co-located NIU with the GPS 1 pps signal. Preferably using software, the phase difference is read and the pll 107 operates to keep the new phase difference constant. This can be accomplished by executing a phase lock loop algorithm that writes values to the DAC an keeps the phase difference constant. As a result, the high stability oscillator in the RFC will be steered such that the C-NET timing marks received by the NIU will have a constant phase relationship with the GPS 1 pps signal. This has the effect of locking the C-NET stream received by all NIU's to the GPS 1pps at the control point. This eliminates the effect of satellite wobble. Also, the RFC could change the phase relationship so that the transmitted data is exactly synchronized to GPS.

It should be noted that it is not really necessary to have a co-located NIU. In practice, it may be sufficient to have a satellite receiver at the control point. Additional circuitry could be built into the RFC to recover the C-NET (or equivalent) frame pulse. Using an output from an NIU phase-locked loop (pll) has the advantage of eliminating the jitter present in the received satellite clock. However, minor modification to the RFC pll algorithm could accomplish the same thing.

What is claimed is:

1. A method for providing time synchronization in a non-real time messaging system, comprising the steps of:
   (a) receiving source information from a satellite, the source information having timing information and originating from a control point satellite uplink, the source information being received by a plurality of receivers remote from the control point satellite uplink;
   (b) receiving an absolute time reference coupled to one of the plurality of receivers;
   (c) generating an offset signal calculated from the difference between the absolute time reference and the timing information of the source information;
   (d) providing the control point satellite uplink with the offset signal in order to adjust the timing information to synchronize with the absolute time reference within subsequent source information transmissions from the control point satellite uplink.

2. The method of claim 1, wherein the step of receiving source information comprises the step of receiving C-NET protocol encoded information which has timing information.

3. The method of claim 1, wherein the step of generating an offset signal is calculated by determining the propagation delay from the control point satellite uplink to a plurality of base station transmitters, comprising the steps of:
   (a) measuring a first propagation delay from the control point satellite uplink to a satellite back down to the one of the plurality of receivers, the one of the plurality of receivers being a link monitor;
   (b) estimating a second propagation delay knowing the coordinates of the satellite and the link monitor;
   (c) subtracting the second propagation delay from the first propagation delay to obtain an uplink propagation delay;
   (d) estimating a third propagation delay for each of the base station transmitters knowing the co-ordinates of the satellite and each of the base station transmitters;
   (e) adding the second propagation to the third propagation delay for each of the respective base station transmitters.

4. The method of claim 3, wherein the steps of estimating the second and third propagation delays further comprises the step of determining the satellite co-ordinates by measuring a plurality of propagation delays to four separate link monitors spaced far apart.

5. The method of claim 1, wherein the step of receiving an absolute time reference comprises the step of receiving an absolute time reference at a global positioning system receiver coupled to one of the plurality of receivers.

6. The method of claim 5, wherein the one of the plurality of receivers is a link monitor co-located with the control point satellite uplink that further receives the timing information and calculates the difference between the timing information and the absolute time reference to provide the offset signal.

7. A method for providing time synchronization in a non-real time messaging system, comprising the steps of:
   (a) receiving source information at a base station from a satellite, the source information having timing information and originating from a control point satellite uplink;
   (b) transmitting the source information from the base station using a synchronized time division protocol to a plurality of receivers remote from the control point satellite uplink;
   (c) receiving an absolute time reference coupled to one of the plurality of receivers;
   (d) generating an offset signal calculated from the difference between the absolute time reference and the timing information of the source information;
   (e) providing the control point satellite uplink with the offset signal in order to adjust the timing information to synchronize with the absolute time reference within subsequent source information transmissions from the control point satellite uplink.

8. The method of claim 7, wherein the step of receiving source information comprises the step of receiving FLEX protocol encoded information which uses a Global Positioning System time stamp as a reference time source from a Global Positioning System receiver coupled to the control point satellite uplink.

9. The method of claim 7, wherein the step of transmitting the source information comprises the step of transmitting FLEX protocol encoded information to a plurality of receivers.

10. The method of claim 7, wherein the step of receiving an absolute time reference comprises the step of receiving an absolute time reference at a global positioning system receiver coupled to one of the plurality of receivers.

11. The method of claim 10, wherein the one of the plurality of receivers is a fixed base station that receives the timing information and calculates the difference between the timing information and the absolute time reference to provide the offset signal.

12. The method of claim 7, wherein the step of providing the control point satellite uplink with the offset signal comprises the step of sending the offset signal via phone line to the control point satellite uplink.

13. A method for providing time synchronization in a non-real time messaging system using simulcast transmissions by a plurality of base stations, comprising the steps of:
   (a) receiving source information originating from a control point satellite uplink at a base station from a satellite, the source information having timing information derived from a Global Positioning System receiver coupled to the control point satellite uplink;

(b) transmitting the source information from the base station using a FLEX synchronized time division protocol to a plurality of receivers remote from the control point satellite uplink;

(c) receiving an absolute time reference at a Global Positioning System receiver coupled to one of the plurality of receivers;

(d) generating an offset signal calculated from the difference between the absolute time reference and the timing information of the source information;

(e) providing the control point satellite uplink with the offset signal in order to adjust the timing information to synchronize with the absolute time reference within subsequent source information transmissions from the control satellite uplink.

14. A synchronization controller for use in a selective call messaging system, comprising:

a decoder for decoding timing information received from a selective call transmitter base station to provide actual timing information;

an absolute time source that generates a reference time, the absolute time source received from a Global Positioning System receiver;

a comparator for comparing the actual timing information with the reference time to provide an offset signal, the offset signal further used to either offset a set of embedded time marks in future transmissions by the selective call base station transmitter or to offset a launch time by the selective call base station transmitter; and a transmitter for forwarding the offset signal to a control point satellite uplink to adjust timing information to synchronize with the absolute time source at the control point satellite uplink.

15. The synchronization controller of claim 14, wherein the absolute time source is used by a phase lock loop and ultra-high stability oscillator to provide an extremely accurate 10 Mhz clock used as a reference by a FLEX synchronization generator to provide the reference time.

16. A selective call messaging system, comprising:

a control point satellite uplink for transmission of source information to a satellite, the source information having timing information;

a base station for receiving the source information from the satellite and retransmitting the source information using a time division protocol;

a receiver for receiving the source information as transmitted from the base station; and a synchronization controller coupled to the receiver and remotely coupled to the control point satellite uplink, comprising:

a decoder for decoding the timing information received from the base station to provide actual timing information;

an absolute time source that generates a reference time;

a comparator for comparing the actual timing information with the reference time to provide an offset signal;

a transmitter for forwarding the offset signal to the control point satellite uplink to adjust timing information to synchronize with the absolute time source at the control point satellite uplink.

17. The selective call messaging system of claim 16, wherein the decoder of the synchronization controller decodes FLEX protocol encoded information.

18. The selective call messaging system of claim 16, wherein the absolute time source is an atomic clock that is synchronized with a clock at the control point satellite uplink.

19. The selective call messaging system of claim 16, wherein the absolute time source is received from a Global Positioning System receiver.

20. The selective call messaging system of claim 19, wherein the absolute time source is used by a phase lock loop and ultra-high stability oscillator to provide an extremely accurate 10 Mhz clock used as a reference by a FLEX synchronization generator to provide the reference time.

21. A selective call messaging system, comprising:

a control point satellite uplink for transmission of source information to a satellite, the source information having timing information encoded in a FLEX time division protocol;

a base station for receiving the source information from the satellite and retransmitting the source information using the FLEX time division protocol;

a fixed base receiver for receiving the source information as transmitted from the base station;

a synchronization controller coupled to the fixed base receiver and remotely coupled to the control point satellite uplink, comprising:

a decoder for decoding the timing information received from the base station and derived from the FLEX time division protocol to provide actual timing information;

an absolute time source derived from a Global Positioning System receiver to generate a reference time;

a comparator for comparing the actual timing information with the reference time to provide an offset signal; and a transmitter for forwarding the offset signal to the control point satellite uplink to adjust timing information to synchronize with the absolute time source at the control point satellite uplink.

22. The synchronization controller for use in a selective call messaging system, comprising:

a first phase lock loop for receiving an absolute time reference at the input of a first phase detector and creating a first divided down signal;

a second phase lock loop for receiving the first divided down signal at a second phase detector and creating a second divided down signal;

a multiplexer within the first phase lock loop for multiplexing the first divided down signal and the second divided down signal; and an algorithm for maintaining a constant phase difference between the first phase lock loop and the second phase lock loop.

* * * * *